Aug. 1, 1967 J. N. POLICHETTE 3,334,028

METHOD OF ELECTROPLATING SELECTED AREAS

Original Filed July 27, 1962 3 Sheets-Sheet 1

INVENTOR.
JOSEPH N. POLICHETTE
BY
Morgan, Finnegan, Durham & Pine
ATTORNEYS

Aug. 1, 1967 J. N. POLICHETTE 3,334,028

METHOD OF ELECTROPLATING SELECTED AREAS

Original Filed July 27, 1962 3 Sheets-Sheet 2

INVENTOR.
JOSEPH N. POLICHETTE

BY

Morgan, Finnegan, Durham & Pine

ATTORNEYS

METHOD OF ELECTROPLATING SELECTED AREAS

Original Filed July 27, 1962

INVENTOR.
JOSEPH N. POLICHETTE
BY
Morgan, Finnegan, Durham & Pine
ATTORNEYS

United States Patent Office 3,334,028
Patented Aug. 1, 1967

3,334,028
METHOD OF ELECTROPLATING SELECTED AREAS

Joseph N. Polichette, South Farmingdale, N.Y., assignor, by mesne assignments, to Day Company, N.V., a corporation of Curacao Continuation of application Ser. No. 212,820, July 27, 1962. This application Aug. 2, 1966, Ser. No. 569,753
12 Claims. (Cl. 204—15)

This is a continuation of application Ser. No. 212,820, filed July 27, 1962, now abandoned.

This invention relates to electroplating techniques and more particularly to methods and apparatus for electrolytically depositing metal on surfaces such as those forming conductive elements in electric circuits.

In conventional electroplating techniques, the surface to be plated is connected as one electrode to a source of potential. In the case of plating small conductive segments, or a large group of individually insulated segments (these being frequently encountered in printed circuit assemblies) this general requirement is sometimes difficult and frequently impossible to meet. As a result, many printed circuit processes can not avail themselves of several excellent attributes of electroplating.

It is thus one object of the invention to provide techniques for electroplating surfaces without the need for making conventional electrical connections between said surfaces and a source of potential.

A further and more general object of the invention is to extend electroplating techniques to one or more surfaces not practicably amenable to service as electrodes.

A still further object of the invention is to provide electroplating systems which are self-contained and independent of the work to be electroplated and do not require the usual large volume plating tanks.

These and other objects and advantages of the invention, such as improved portability, compactness and accuracy and increased adaptability to automated operation, will be set forth in part hereinafter and in part will be obvious herefrom, or may be learned by practice with the invention, the same being realized and attained by means of the methods, steps, instrumentalities and combinations pointed out in the appended claims.

The invention consists in the novel methods, steps, parts, combinations, compositions and improvements herein shown and described.

Serving to illustrate exemplary embodiments of the invention are the drawings of which:

Figure 1:
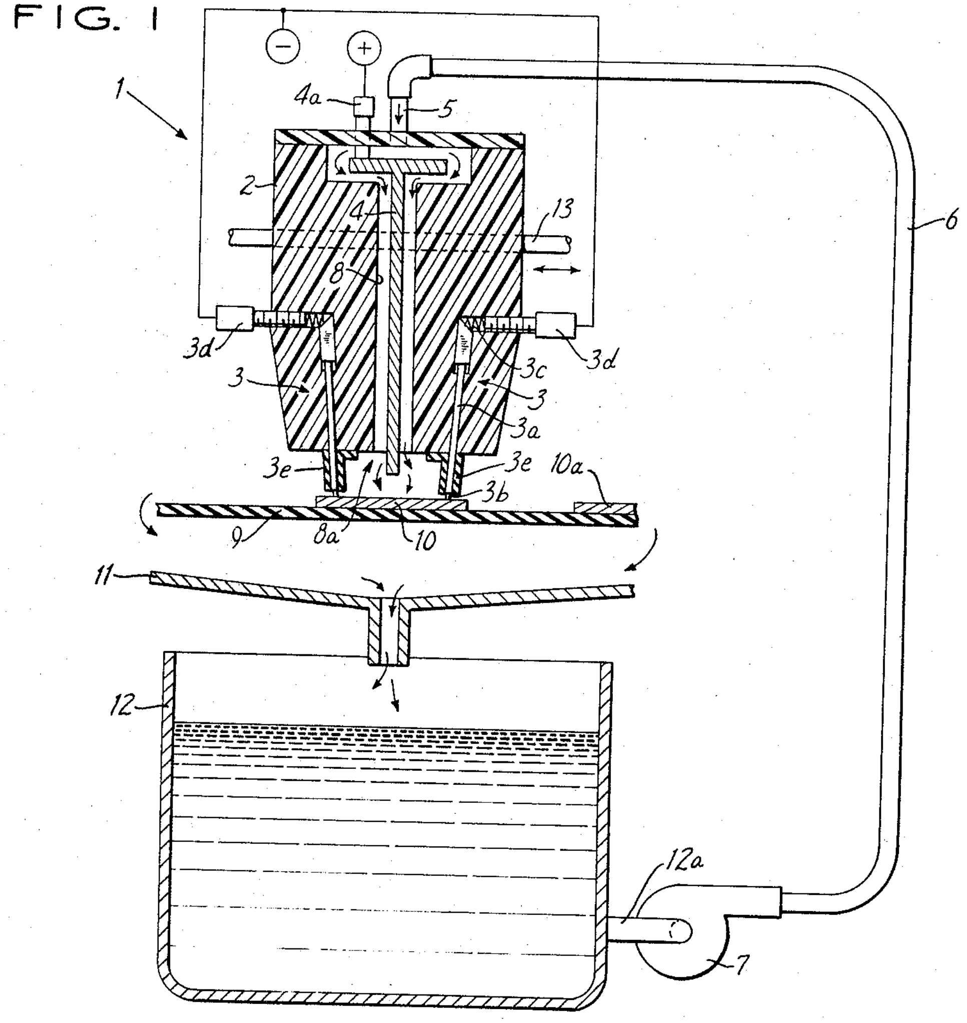
FIGURE 1 is an elevational view partly schematic and partly in section of an electroplating system according to the invention.
Figure 1B:
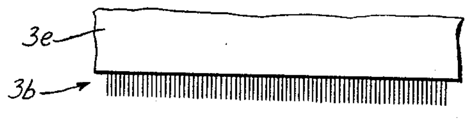
FIGURE 1B is a fragmentary elevational view of the cathode section of FIGURE 1.
Figure 1A:
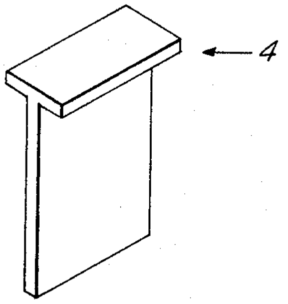
FIGURE 1A is a detail perspective view of the anode of FIGURE 1.

In the drawing, the spacing and extension of the electrodes have been exaggerated to facilitate their description.

As seen in FIGURE 1, the system according to the invention includes a plating head generally indicated at 1 comprising insulated base member 2 supporting a plurality of cathodes 3 and an anode 4. The cathodes 3 are each adapted to make selective contact with the surface 10 to be plated.

Each cathode illustratively comprises a linear array of tubes 3*a*, each tube having individually insulated work-contacting bristles 3*b* fixed at one end thereof and a spring 3*c* contacting the opposite bevelled end to urge the electrode into contact with the work. The opposite end of each spring is in compression contact with a respective screw 3*d* threaded laterally into housing 2. The contacts 3*b* are each electrically connected to the respective screw 3*d* via the associated tube and spring.

Member 2 constitutes a component of an electrolyte distributing system which illustratively includes an electrolyte inlet 5 supplied by a feed line 6 which is connected to a pump 7. The electrolyte injected at inlet 5 traverses a path which includes anode 4 and an electrolyte distributor channel 8, communicating at one end with inlet 5 and at its opposite end with an outlet 8*a*. After leaving this outlet the electrolyte traverses a region which includes the work 9 including the segment 10 to be plated. The electrolyte thereafter passes through the space enclosed by the cathodes and is collected in a trough 11 and fed to a reservoir 12; the output port 12*a* of the trough feeds the pump 7. The sections of cathode tubes 3*a* which extend out of housing 2 are insulated from the electrolyte by virtue of insulated sleeves 3*e* which also function to confine the electrolyte.

Electrical contact to anode 4 is made by way of a clamp connector 4*a*. This terminal is connected to the positive side of the source while all the cathode screw terminals 3*d* connect together and to the negative side.

The system includes means for providing relative movement between plating head 1 and work 9 and this is illustratively provided by guide rods or tracks 13 which slidably support head 1 so that the latter may be displaced relative to the work 9. The latter is positioned relative to cathodes 3 so that these electrodes may make contact with successive regions of surface 10 as relative displacement of work and head occurs.

In operation, pump 7 is actuated producing a continuous flowing electrolyte and the work 9 is brought into proximity with the cathodes 3 such that the uninsulated ends of bristles 3*b* and the flowing electrolyte contact the segment 10 to be plated. This contact is selectively resiliently urged by way of the series of springs 3*c*, each of which is adjustable in accordance with the adjustment of the respective screw 3*d*. Anode 4 is also in contact with the electrolyte. As the cathodes traverse segment 10, metal is plated out of the electrolyte and deposited on the same. Continued displacement of head 2 brings cathodes 3 and the electrolyte into contact with other segments to be plated such as 10*a* whereby the latter receives a metallic coating.

Figure 2:
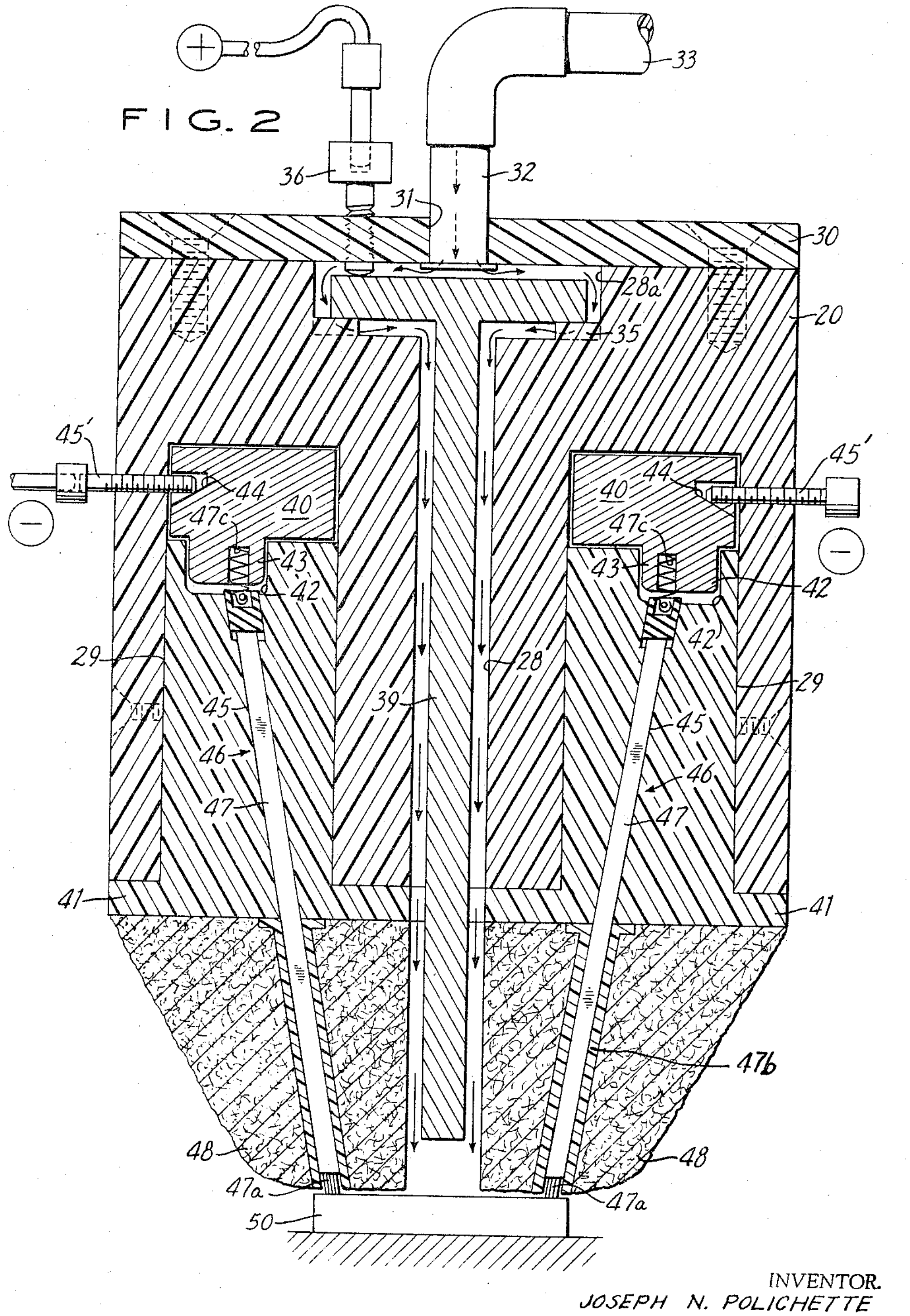
FIGURE 2 is an elevational enlarged view in section of a plating head.

Further details of a plating head according to the invention are illustrated in FIGURE 2. As illustrated therein, there is provided an insulated base member 20 conveniently formed from a block of polyvinylchloride and having a slotted anode recess and electrolyte distributor channel 28 passing through the center thereof. Additional slotted recesses 29 extend up from the base of member 20 and are conveniently disposed symmetrically on either side of recess 28. An insulated cover assembly 30 is provided for base 20, being advantageously constructed of polyvinylchloride, and having a bore 31 therein. Disposed in the bore is an electrolyte inlet 32 comprising a hollow, insulated and preferably plastic tube. The upper end of this tube is connected to a feed line 33.

Disposed in spaced relation in recess 28 is anode 39, illustratively of lead construction and having a generally T-shaped cross section. The head of 39 is seated on lands 35 disposed in the corners of the recessed upper section 28*a* thus providing for the passage of electrolyte as indicated by the arrows.

Electrical connection is made to the anode 39 by way of an anode connector 36 adapted for connection to the positive side of the supply. This connector is conveniently threaded through cover 30 and the end thereof brought into electrical contact with the head of the anode.

Disposed in the upper portions of recesses 29 in base 20 are respective cathode contact plates, conveniently in the form of aluminum members 40 which also serve as buses. Mounted in the recesses 29 below members 40 and spaced therefrom are respective cathode base supports 41, illustratively of polypropylene. The latter include recesses 42 adapted to receive contact portions 43 of members 40. Each base support 41 includes a linear array of passageways 45 through each of which is routed a respective cathode 46 advantageously formed of a metallic tube 47 having copper bristles or wires 47*a* covered with an insulation such as plastisol except at their work-contacting ends and where they connect with the respective tube.

Between the interior end of each cathode tube 47 and the contact member 40 is a spring 47*c* which resiliently urges the respective cathode in the direction of the work. Each member 40 includes an inclined cut-out 44 which is contacted by the head of a respective terminal connector and clamp 45'. The latter is threadably installed in the side of base member 20 and its engaging portion brought into pressure engagement with the inclined region 44 of respective bus 40 so that the latter compresses its associated series of springs 47*c* thereby providing the required resilience and electrical contact with all of the respective cathodes.

The exterior region of each cathode 46 is disposed within a respective insulated sleeve 47*b* and the latter is located within a member 48 which is advantageously formed of hard or impregnated felt and fixed to the base of corresponding support 41. The remote end of each cathode extends to the outside surface of this cover so as to be capable of contacting work 50.

The above-described arrangement functions in an analogous manner to that described with respect to FIGURE 1, whereby electrolytic plating of a series of elements such as 50 is effected. Either the electrolyte distributing system of FIGURE 1 or other supply means may be employed to provide electrolyte at inlet 32. Members 48 serve to confine the solution to the region of the cathode-contacted work and the solution thus tends to flow laterally (perpendicular to the plane of the figure) out of the end regions of the plating head and thence to the collector and reservoir such as illustrated in FIGURE 1.

Figure 3:
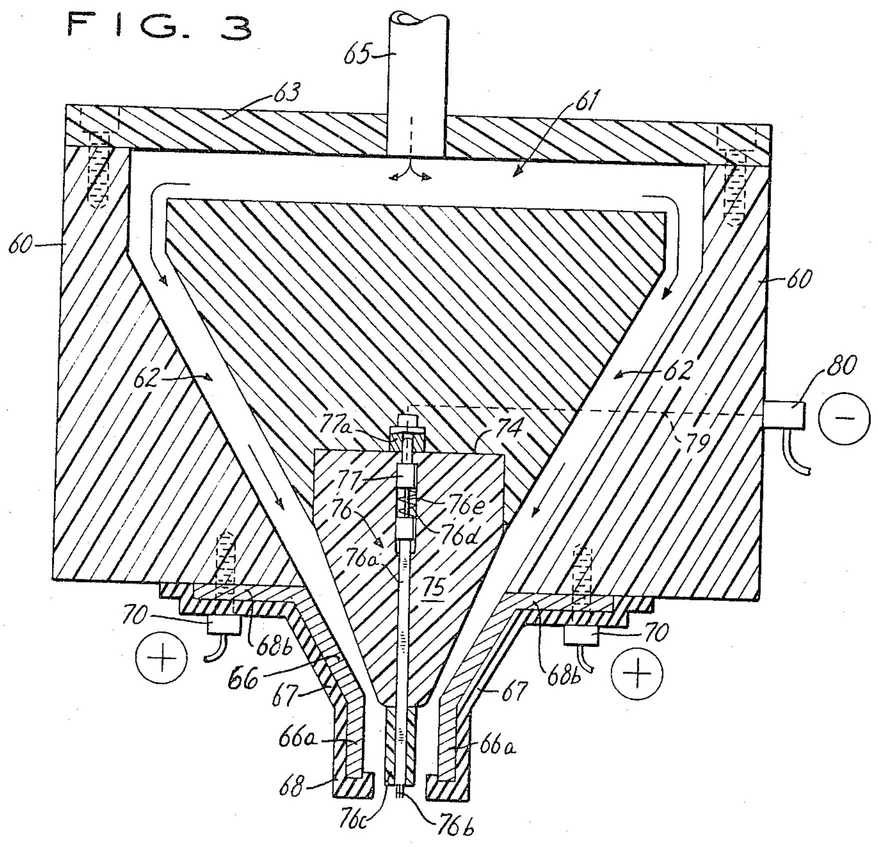
FIGURE 3 is an elevational view of an alternate plating head embodiment adapted for use in the system of FIGURE 1.

In FIGURE 3 an alternate embodiment is shown and comprises an insulated base support 60, preferably of polyvinylchloride and having a recess 61 in the upper section thereof and a pair of electrolyte distributor channels 62 in communication with recess 61. Electrolyte flow is as indicated by the arrows. A cover assembly 63 is connected over member 60 and includes an insulated inlet tube 65 in communication with recess 61 for the feeding of electrolyte thereto.

Secured to the base of member 60 and depending therefrom is a pair of anodes 66 illustratively of stainless steel. The outside surfaces of these anodes are advantageously covered by an insulated layer 67.

The depending regions of the anodes 66 preferably comprise parallel opposing sections 66*a* on the outer surfaces and ends of which are secured respective solution confining means embodied as resilient wipers 68 of insulating material. The ends of each anode adjacent the member 60 are formed as integral flanges 68*b* and these are secured to member 60 as by threaded studs 70 which also serve as electrical terminals adapted for connection to the positive side of the supply.

In a recess 74 in the central section of member 60 there is fixed a cathode housing 75 preferably of plastic composition such as polyvinylchloride. Disposed within housing 75 is an array of cathodes 76 which are conveniently formed as a linear series of spaced metallic tubes 76*a* each having groups of individually insulated wires or other electrical contact means 76*b* fixed to the end thereof. Covering the region of each tube 76*a* which is exterior to housing 75 is an insulated sleeve 76*c*. The internal end of each cathode tube 76 is resiliently loaded by a spring 76*d* and is also connected as by wire 76*e* to a respective cathode plug 77; each of the latter connects as by a respective jack 77*a* and lead 79 to a cathode terminal 80 adapted for connection to the negative supply.

The exterior ends of each cathode may comprise other than brush material, for example a solid electrical wiper.

Operation of the plating head is similar to that previously described. An auxiliary or substitute anode may be advantageously located in recess 61 in certain applications. Moreover, where the circuit pattern is such that deplating of remote conductive elements is not likely, a single anode and single cathode may be advantageously employed in the plating head.

While the system according to the invention has been described with reference to printed circuit assemblies, it will be appreciated that broader applications may be made.

The invention is not limited to the specific steps, methods, compositions, combinations and improvements described but departures may be made therefrom within the scope of the accompanying claims without departing from the principles of the invention and without sacrificing its chief advantages.

What is claimed is:

1. A method of selectively electroplating each of a plurality of contiguous electrically isolated charge conductive surfaces comprising the steps of electrolytically contacting an anode electrode spaced from said surfaces with a free flowing stream of an electroplating electrolyte, distributing said free-flowing stream of said electrolyte over a selected one of said surfaces, slidably contacting said selected surface with a cathode electrode, and blocking the flow of said free-flowing electrolyte stream from the remainder of the other of said surfaces not in contact with said cathode to minimize corrosion currents and repeating said steps to electroplate the remaining surfaces.

2. A method according to claim 1 in which said selected surface is slidably contacted by two such cathode electrodes and in which said stream is constrained to flow over said selected surface between said cathode electrodes.

3. A method according to claim 1 in which said selected surface is slidably contacted by two such cathode electrodes between which is said anode electrode.

4. A method according to claim 1 in which said electrolyte is in electrolytic contact with a plurality of anodes and in which said stream is constrained to flow over said selected surface between said anode electrodes.

5. A method according to claim 4 in which said electrolyte is with contact by said anode electrode by flowing said electrolyte over said anode electrode.

6. A method according to claim 4 in which said electrolyte is recirculated to successively distribute same over said selected surfaces.

7. A method according to claim 4 in which said cathode structures comprise two cathodes and in which said selected and a contiguous surface are contacted by a respective one of said cathode electrodes for limiting the distribution of said electrolyte.

8. A method according to claim 4 in which said anode electrodes include anode insulating portions urged against said surfaces to wipe same.

9. A method according to claim 4 in which said contiguous surfaces are successively wiped by a non-electrode.

10. A method according to claim 4 in which said cathode electrode makes continuously successive resilient pressure contact with each of said selected surfaces.

11. A method according to claim 4 in which said stream of electrolyte is maintained in substantially fixed relation to said cathode electrode.

12. A method according to claim 4 in which said cathode electrode makes sliding contact with each of said selected surfaces.

References Cited

FOREIGN PATENTS

| | | |
|---|---|---|
| 727,789 | 4/1955 | Great Britain. |
| 453,612 | 4/1913 | France. |
| 394,620 | 10/1955 | Germany. |

JOHN H. MACK, *Primary Examiner.*

T. TUFARIELLO, *Assistant Examiner.*